(12) United States Patent
Demiralp

(10) Patent No.: US 12,124,436 B1
(45) Date of Patent: Oct. 22, 2024

(54) AUGMENTING DECISION MAKING VIA INTERACTIVE WHAT-IF ANALYSIS

(71) Applicant: SIGMA COMPUTING, INC., San Francisco, CA (US)

(72) Inventor: Çağatay Demiralp, Austin, TX (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/941,283

(22) Filed: Sep. 9, 2022

(51) Int. Cl.
*G06F 16/24* (2019.01)
*G06F 16/242* (2019.01)
*G06Q 10/0637* (2023.01)

(52) U.S. Cl.
CPC ... *G06F 16/2428* (2019.01); *G06Q 10/06375* (2013.01)

(58) Field of Classification Search
CPC ............ G06F 16/2428; G06F 16/2433; G06Q 10/06375
See application file for complete search history.

(56) References Cited

U.S. PATENT DOCUMENTS

| | | | |
|---|---|---|---|
| 7,013,312 | B2 | 3/2006 | Bala et al. |
| 7,921,200 | B2 | 4/2011 | Dieberger et al. |
| 10,740,404 | B1 | 8/2020 | Hjermstad et al. |
| 10,891,335 | B2 | 1/2021 | Cavallo et al. |
| 11,327,944 | B1 | 5/2022 | Payonk et al. |
| 11,561,967 | B2 | 1/2023 | Seiden et al. |
| 2012/0130979 | A1 | 5/2012 | Williamson |
| 2013/0093402 | A1 | 4/2013 | Akahane |
| 2015/0006433 | A1 | 1/2015 | Phillips et al. |
| 2016/0104076 | A1 | 4/2016 | Maheshwari et al. |
| 2016/0104093 | A1 | 4/2016 | Fletcher et al. |
| 2016/0105338 | A1 | 4/2016 | Fletcher et al. |
| 2018/0024901 | A1 | 1/2018 | Tankersley et al. |
| 2018/0158079 | A1 | 6/2018 | Chu et al. |
| 2020/0027137 | A1 | 1/2020 | Miller et al. |
| 2020/0293587 | A1* | 9/2020 | Ayers ............... G06F 16/90335 |
| 2020/0403862 | A1* | 12/2020 | Erblat .................... H04L 67/10 |
| 2021/0224288 | A1 | 7/2021 | Seiden et al. |
| 2021/0390451 | A1 | 12/2021 | Kisamori et al. |

(Continued)

OTHER PUBLICATIONS

Cavallo et al., "A Visual Interaction Framework for Dimensionality Reduction Based Data Exploration," Conference on Human Factors in Computing Systems (CHI), Apr. 21-26, 2018, Montreal, QC, Canada, https://arxiv.org/pdf/1811.12199.pdf, 13 pages.

(Continued)

*Primary Examiner* — Loc Tran

(57) ABSTRACT

Augmenting decision-making via interactive what-if analysis including receiving, by a query execution engine, a state specification of a graphical user interface that includes a selection of driver importance variables that correlate to a target variable, generating, by the query execution engine, a database query using the received state specification, wherein the database query is composed to retrieve a query result from a cloud-based data warehouse, based on the query result, calculating, by the query execution engine, an importance value of each selected driver importance variable relative to the target variable, and presenting the calculated importance value in a driver importance view of the graphical user interface.

14 Claims, 7 Drawing Sheets

(56) References Cited

U.S. PATENT DOCUMENTS

| | | |
|---|---|---|
| 2022/0107945 A1 | 4/2022 | Seiden et al. |
| 2022/0179862 A1 | 6/2022 | Singh Bawa et al. |
| 2023/0083404 A1 | 3/2023 | Dong et al. |
| 2023/0289698 A1 | 9/2023 | Bly et al. |

OTHER PUBLICATIONS

Gathani et al., "Augmenting Decision Making via Interactive What-If Analysis," 12th Annual Conference on Innovative Data Systems Research (CIDR '22), Jan. 9-12, 2022, Chaminade, CA, USA, 8 pages.

Hulsebos et al., "Making Table Understanding Work in Practice," https://arxiv.org/pdf/2109.05173.pdf, 12th Annual Conference on Innovative Data Systems Research (CIDR '22), Jan. 9-12, 2022, Chaminade, CA, USA, 6 pages.

\* cited by examiner

AUGMENTING DECISION MAKING VIA INTERACTIVE WHAT-IF ANALYSIS

BACKGROUND

Field of the Invention

The field of the invention is data processing, or, more specifically, methods, apparatus, and products for augmenting decision-making via interactive what-if analysis.

Description of Related Art

Modern businesses may store large amounts of data in remote databases within cloud-based data warehouses. This data may be accessed using database query languages, such as structured query language (SQL). Queries may be used to retrieve data that is then analyzed to make decisions, such as business decisions. Manipulating the data stored in the database may require constructing complex queries beyond the abilities of most users. Further, it may be difficult to quickly gain actionable insights from the retrieved data that can be used to make decisions.

SUMMARY

Methods, systems, and apparatus for augmenting decision-making via interactive what-if analysis are disclosed. Augmenting decision-making via interactive what-if analysis includes receiving, by a query execution engine, a state specification of a graphical user interface that includes a selection of driver variables that correlate to a target variable; generating, by the query execution engine, a database query using the received state specification, wherein the database query is composed to retrieve a query result from a cloud-based data warehouse; based on the query result, calculating, by the query execution engine, an importance value of each selected driver variable relative to the target variable; and presenting the calculated importance value in a driver importance view of the graphical user interface.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
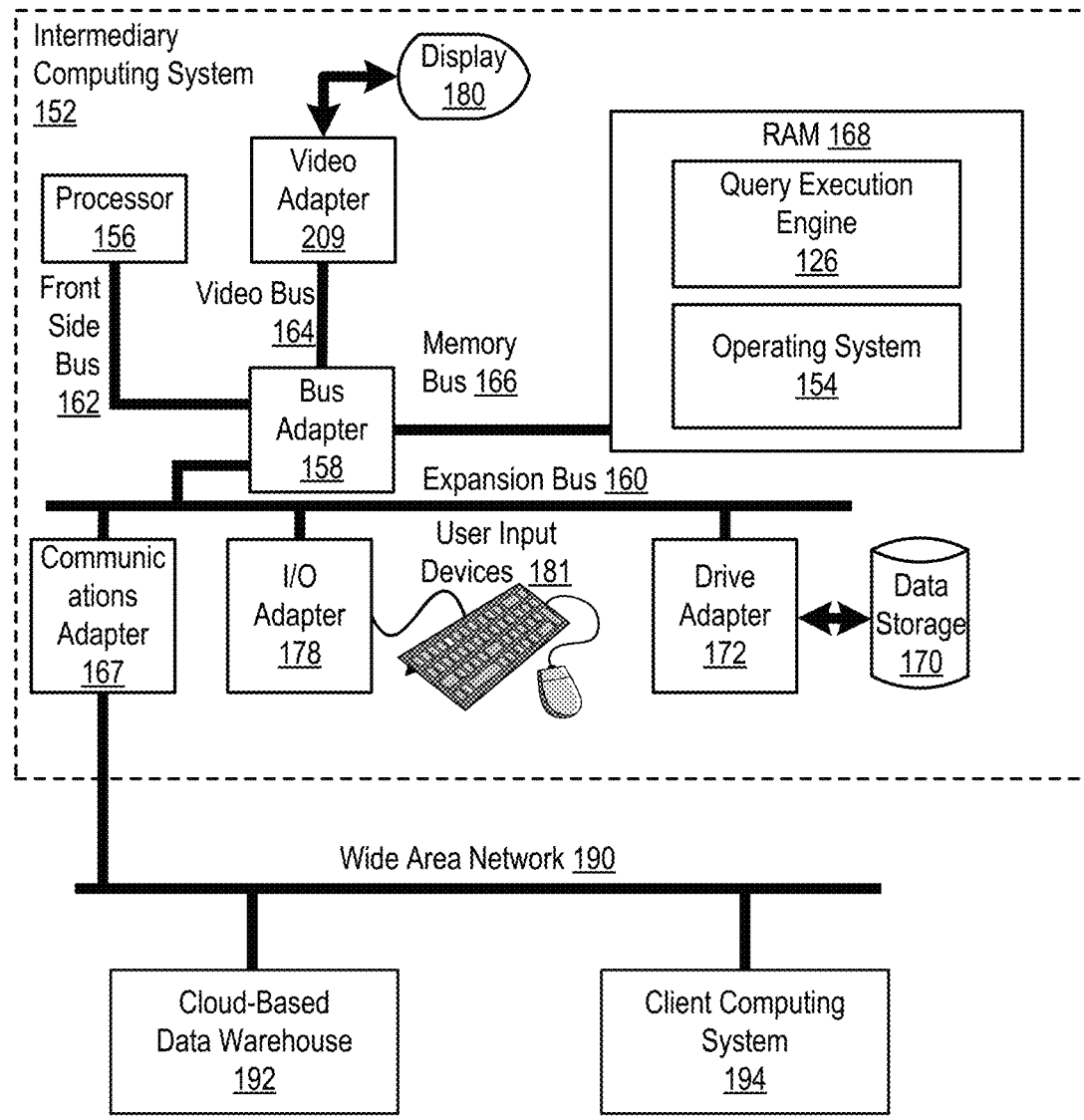
FIG. 1 sets forth a block diagram of an example system configured for augmenting decision-making via interactive what-if analysis according to embodiments of the present invention.

Exemplary methods, apparatus, and products for augmenting decision-making via interactive what-if analysis in accordance with the present invention are described with reference to the accompanying drawings, beginning with FIG. 1. FIG. 1 sets forth a block diagram of automated computing machinery comprising an exemplary intermediary computing system 152 configured for augmenting decision-making via interactive what-if analysis according to embodiments of the present invention. The intermediary computing system 152 of FIG. 1 includes at least one computer processor 156 or 'CPU' as well as random access memory 168 (RAM') which is connected through a high speed memory bus 166 and bus adapter 158 to processor 156 and to other components of the intermediary computing system 152.

Stored in RAM 168 is an operating system 154. Operating systems useful in computers configured for augmenting decision-making via interactive what-if analysis according to embodiments of the present invention include UNIX, Linux, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the query execution engine 126, a module for augmenting decision-making via interactive what-if analysis according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for augmenting decision-making via interactive what-if analysis according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for augmenting decision-making via interactive what-if analysis according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the query execution engine 126. Although FIG. 1 depicts the query execution engine within the intermediary computing system 152, the query execution engine may alternatively be executed within the client computing system 194.

Figure 2:
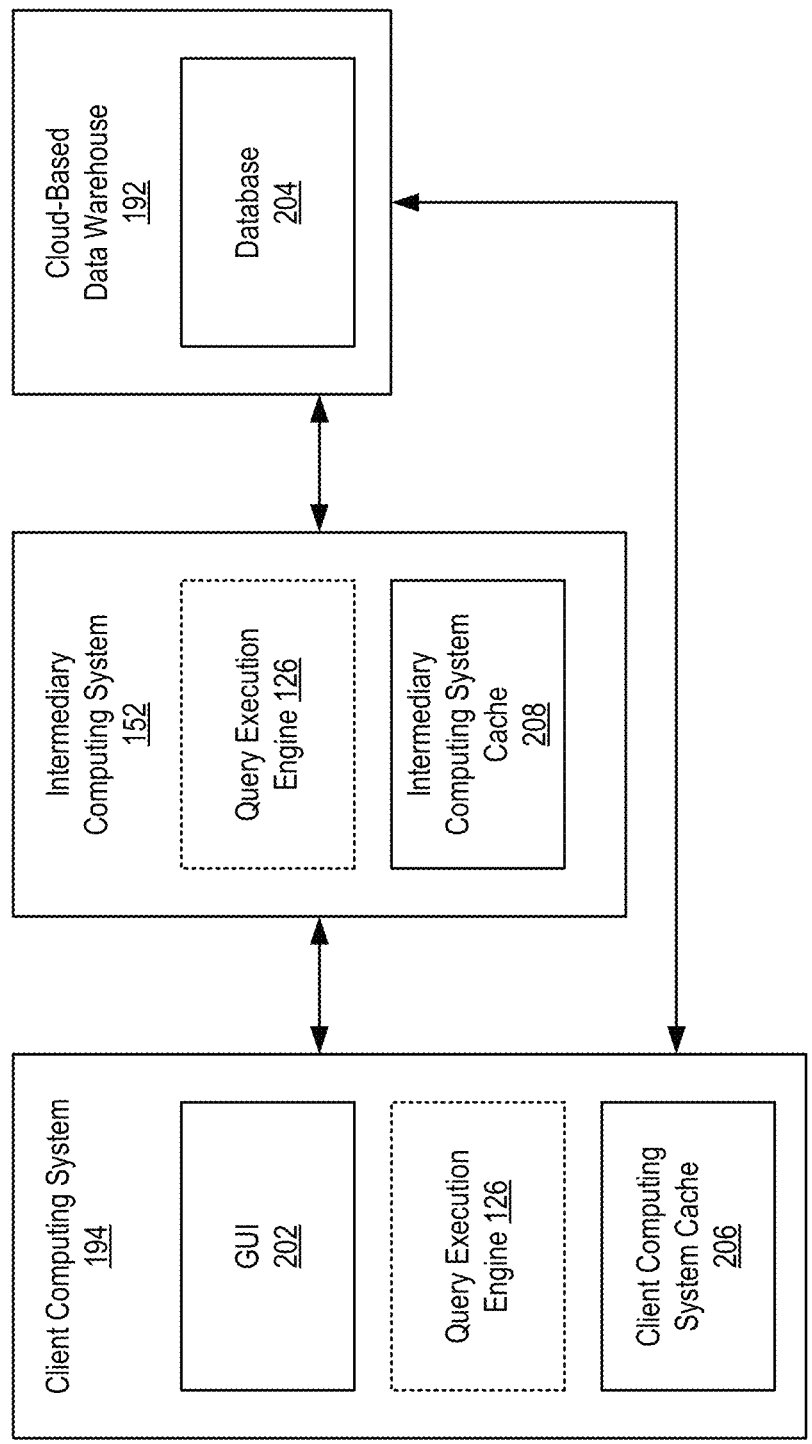
FIG. 2 sets forth a block diagram of an example system configured for augmenting decision-making via interactive what-if analysis according to embodiments of the present invention.

FIG. 2 shows an exemplary system for augmenting decision-making via interactive what-if analysis according to embodiments of the present invention. As shown in FIG. 2, the system includes a client computing system 194, an intermediary computing system 152, and a cloud-based data warehouse 192. The client computing system 194 includes a graphical user interface (GUI) 202 and a client computing system cache 206. The intermediary computing system 152 includes an intermediary computing system cache 208. The cloud-based data warehouse 192 includes a database 204. The query execution engine 126 may reside on either the client computing system 194 and/or the intermediary computing system 152 and utilize the associated computing system cache (client computing system cache 206, intermediary computing system cache 208). The cache may be a browser cache associated with an Internet browser. The client computing system 194 may access the cloud-based data warehouse 192 and database 204 directly or may access the cloud-based data warehouse 192 and database 204 via the intermediary computing system 152.

The GUI 202 is a visual presentation configured to present data sets in the form of worksheets and graphical elements to a user. The GUI 202 also receives requests from a user for data sets from the database 204. The GUI 202 may be presented, in part, by the query execution engine 126 and displayed on a client computing system 194 (e.g., on a system display or mobile touchscreen). The GUI 202 may be part of an Internet application that includes the query execution engine 126 and is hosted on the intermediary computing system 152. Alternatively, the GUI 202 may be part of an Internet application that includes the query execution engine 126 and is hosted on the client computing system 194.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. A data set, as sent from the database to the intermediary computing system 152 and client computing system 194, may be a portion or subset of a source database table on the database. Data sets may be sent from the cloud-based data warehouse 192 in response to a database query. Accordingly, data sets retrieved in response to a database query may be referred to as query results.

The query execution engine 126 is hardware, software, or an aggregation of hardware and software configured to receive a state specification from the client computing system 194, via the GUI 202. The query execution engine 126 is also configured to generate database queries in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The query execution engine 126 uses the state specification as input to generate a database query. This transformation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

The query execution engine 126 may use the database query to fetch query results (i.e. a data set) from the database 204. The query execution engine 126 may then present the query results to a user via the GUI 202. The query execution engine 126 may also store the query results in a cache (client computing system cache 206, intermediary computing system cache 208) for later retrieval if the same or similar query is generated from a state specification. Further, as described below, the query execution engine 126 may expand the generated database queries such that the expanded results stored in the cache may be used to locally service a greater number of database queries without sending additional database queries to the cloud-based data warehouse 192.

Figure 3:
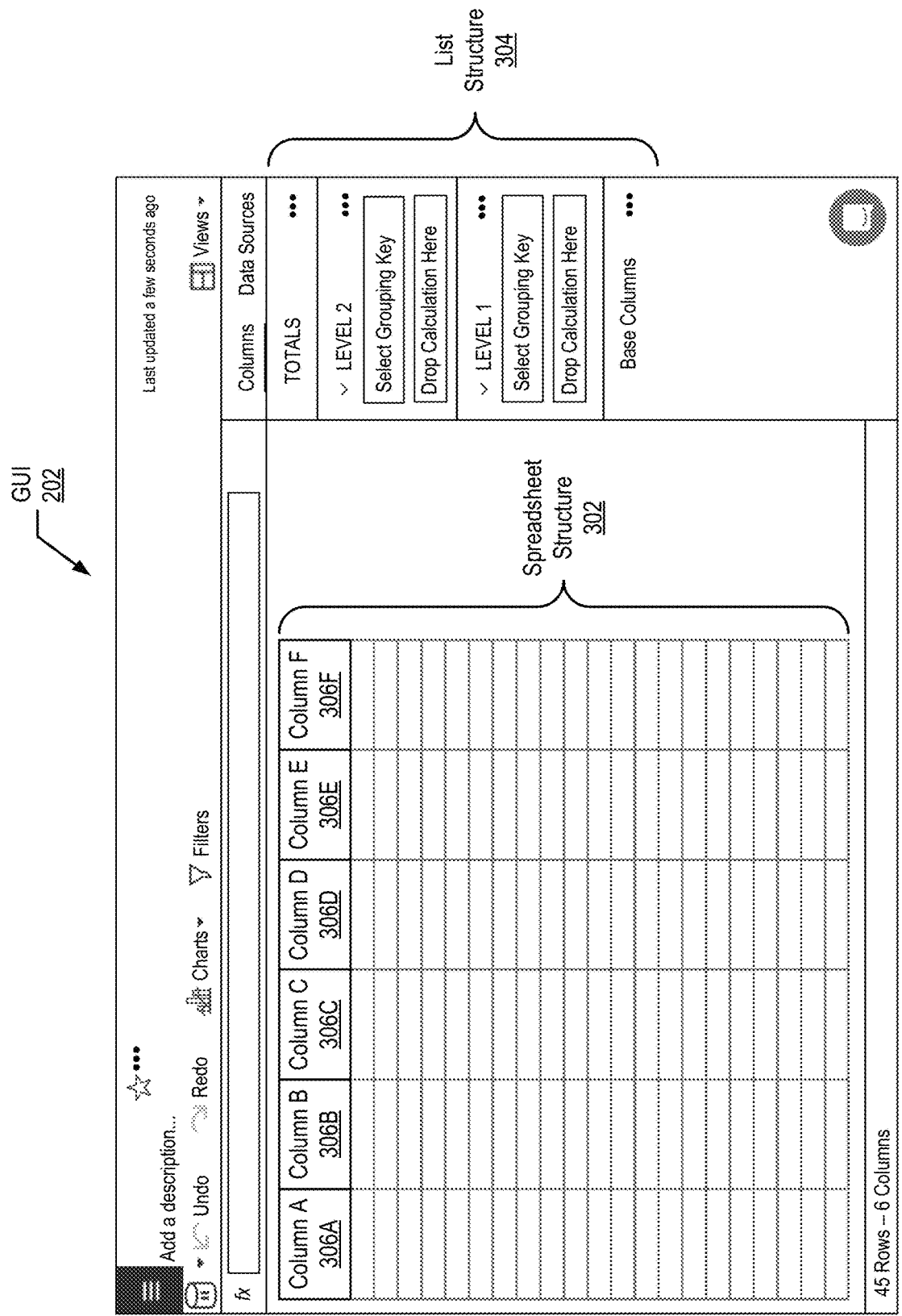
FIG. 3 sets forth a block diagram of an example system configured for augmenting decision-making via interactive what-if analysis according to embodiments of the present invention.

FIG. 3 shows an exemplary system for augmenting decision-making via interactive what-if analysis according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F).

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the query execution engine 126. Such a mechanism may also include a direct identification of the rows and columns of a database table that a user would like to access (e.g., via a selection of the rows and columns in a dialog box).

The query execution engine may enable business users to perform decision analysis tasks in order to make more informed business decisions. As an example, a user may wish to determine a budget for a certain type of advertising or type of marketing function so as to achieve a particular business goal (e.g., a target number of customer renewals, a target number of new customers, a target number of subscription upgrades, etc.). The user may have a fixed marketing and advertising budget and wish to know whether to prioritize certain marketing/advertising functions over others. In order to discover the relationship between data attributes hypothesized to be driver variables and those actually corresponding to target variables, business users may need to perform lengthy exploratory analyses. Such analysis may be challenging and include consideration of multitudes of combinations, scenarios, and transformations of the data.

In some implementations, the system described herein enables a user to perform different types of decision analysis using data stored on a cloud-based data warehouse without having to perform complex data analysis operations. In the case of a decision analysis that is a driver importance analysis, the user interface may be configured to present driver importance data corresponding to driver variables that affect the value of a target variable. This importance data may include importance values for each driver variable that is hypothesized to impact the value of a target variable. In the case of a decision analysis that is a sensitivity analysis, the user interface may be configured to present determinations of how sensitive a target variable is to changes in a driver variable's value. In the case of a decision analysis that is a target inversion analysis, the user interface may be configured to present target values for each driver variable to achieve a particular target variable value. In the case of a decision analysis that is a constrained analysis, the user interface may also provide the ability to apply constraints to one or more values (e.g., for driver variables) and determine the impact of those constraints on the target variable.

In some implementations, one or more components of the intermediary computing system (e.g., the query execution engine 126) utilize a machine learning system. The machine learning system may be configured to ingest data pertaining to target variables, driver variables, and other data, and output results obtained from processing the inputted data using one or more machine learning models. The target variable may represent a data point corresponding to performance indicator for a business, such as an amount or rate of deal closings for the business. In some implementations, the intermediary computing system may implement various machine learning models such as linear regression models, random forest classifier models, and the like. The implemented machine learning models may be configured to output driver importance values indicating the importance, relevance, or correlation of a driver variable to a target variable. In some implementations, driver importance values are feature correlation coefficients relative to a target variable. In other words, the driver importance values indicate the degree to which a driver variable is correlated with a target variable. A machine learning model may be trained using driver variable data and target variable data. The data may be historical data obtained from, for example, various business cases that show particular historic values for driver variables that occurred in conjunction with a particular target variable.

Figure 4:
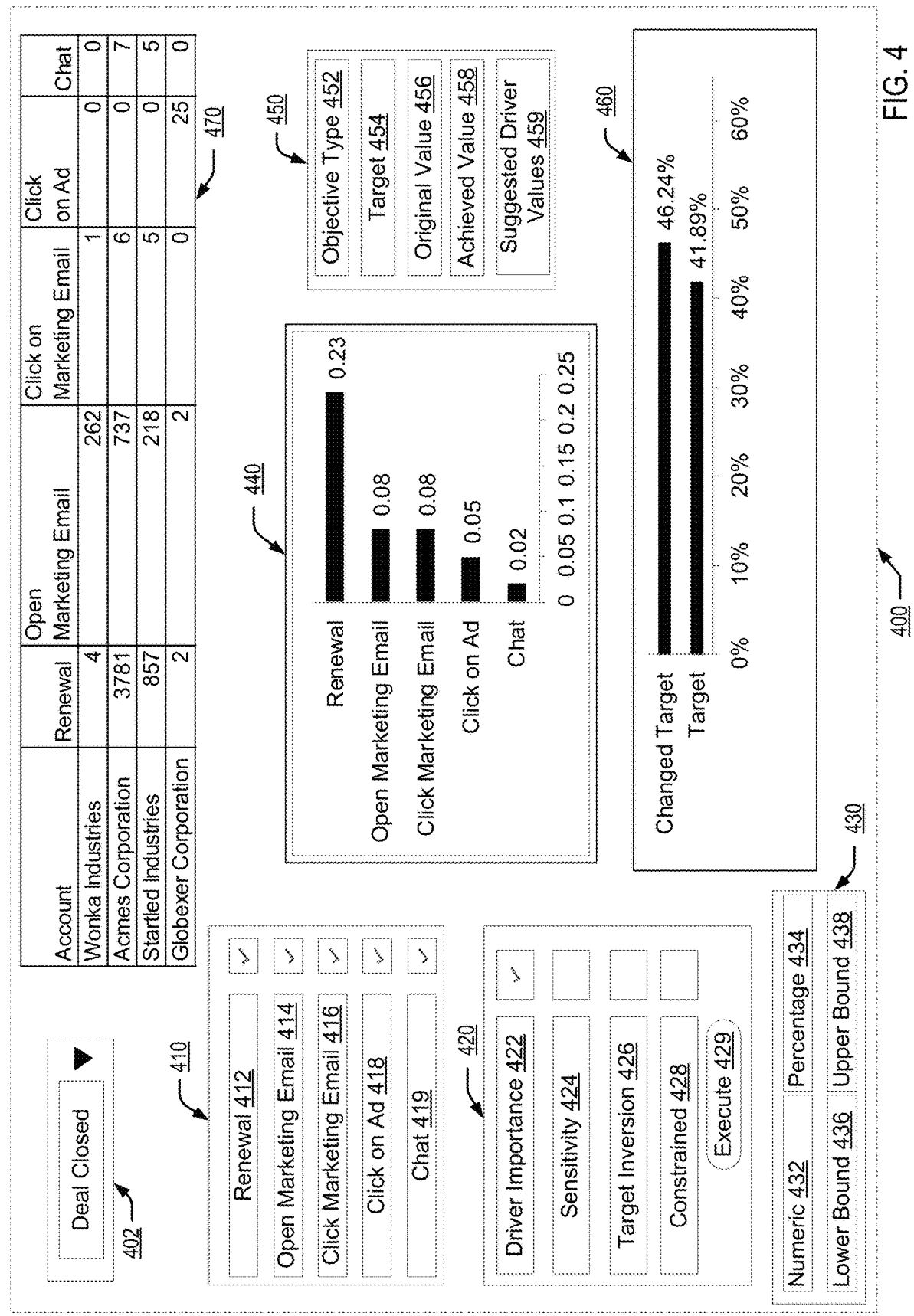
FIG. 4 sets forth a block diagram of an example system configured for augmenting decision-making via interactive what-if analysis according to embodiments of the present invention.

FIG. 4 sets forth a block diagram of an example user interface 400 configured for augmenting decision-making via interactive what-if analysis according to embodiments of the present invention. The user interface 400 may be similar to GUI 202, described above. The user interface 400 may be presented on a display device associated with the client computing system 194. In some implementations, the presentation of the user interface 400 is provided to the client computing system 194 by one or more of the intermediary computing system 152 and the cloud-based data warehouse 192. In other words, the client computing system 194 may just present the user interface 400 whereas the functionality and contents of the user interface 400 are provided by components of the intermediary computing system 152 and/or the cloud-based data warehouse 192.

The user interface 400 may be part of an Internet application that includes the query execution engine 126 and is hosted on the intermediary computing system 152. Alternatively, the user interface 400 may be part of an Internet application that includes the query execution engine 126 and is hosted on the client computing system 194. The query execution engine 126 may use database queries that are generated based on inputs received via the user interface 400. The queries may be, for example, SQL queries. These inputs (also referred to herein as a state specification) may then be used to fetch query results (i.e. a data set) from the database 204. The query execution engine 126 may then present the query results to a user via the user interface 400. Readers will appreciate that the user interface 400 enables a user to query a database, retrieve data, and view decision analysis data using graphical element inputs provided to the user interface 400, thus obviating the need for a business user to perform the complex data analysis operations required to obtain actionable decision analysis insights from the database.

As shown in FIG. 4, the user interface 400 includes a target variable selection element 402, driver variable selection elements 410, decision analysis selection elements 420, perturbation analysis selection elements 430, driver importance analysis view 440, target inversion elements 450, perturbation analysis view 460, and dataset table view 470. In some implementations, the target variable selection element 402, driver variable selection elements 410, decision analysis selection elements 420, perturbation analysis selection elements 430, driver importance analysis view 440, target inversion elements 450, perturbation analysis view 460, and dataset table view 470 all comprise one or more interactive graphical user interface elements that can be used to retrieve, view, select, and/or modify data from the cloud-based data warehouse 192.

These interactive graphical user interface elements may include, without limitation, any of buttons, checkboxes, keypads, sliders, dials, arrow keys, radio buttons, list pickers, text input boxes, and the like. For example, the driver variable selection elements 410 may provide, as shown, checkboxes that, when selected, enable selection of a particular driver variable. Based on the selection of a checkbox for a driver variable, the user interface 400 may be configured to generate a query that, when executed, retrieves data indicating an importance value of the driver variable to a particular target variable. Similarly, an entry of a numeric input in the user interface 400 can be included in a state specification that, when provided to a query execution engine, causes execution of a query including the numeric input against data in the cloud-based data warehouse 192.

In some implementations, the user interface 400 may be configured to operate on a device that includes a touch-sensitive display screen. In such a case, the user interface 400 may be configured to receive touch inputs via the various graphical elements of user interface 400. Similar to the above examples referring to checkboxes or text input boxes, touch inputs may also be included in a state specification that, when provided to a query execution engine, causes execution of a query including the numeric input against data in the cloud-based data warehouse 192.

Driver Importance Analysis

As described above, the user interface 400 includes target variable selection element 402. A user can select a target variable using target variable selection element 402. Based on the selection, the user interface 400 may be configured to generate a state specification that includes the input and send the state specification to the query execution engine 126. In one embodiment, the abovementioned state specification represents a query that, when executed, retrieves a dataset including each driver variable associated with the selected target variable. The user interface 400 may be configured to present a list of the driver variables associated with the selected target variable using driver variable selection elements 410.

As shown, the user interface 400 also includes driver variable selection elements 410. These include variable selection elements 412, 414, 416, 418, and 419, which respectively correspond to the driver variables "Renewal", "Open Marketing Email", "Click Marketing Email", "Click on Ad", and "Chat". As a real-world example, the "Open Marketing Email" driver variable may correspond to a number of times customers (or prospective customers) belonging to various customer accounts have opened marketing emails. Readers will appreciate that the number of marketing emails may be a driver variable that has some correlation with a target variable such as the number of "Deal Closed" events. For example, if a greater number of marketing emails are opened by certain customers, that may bear a positive correlation with the number of deals the customers close or are interested in closing with the business whose data is being presented by the user interface 400.

In some implementations, the driver variable selection elements 410 represent driver variables associated with the variable that was selected using target variable selection element 402. In other implementations, the driver variable selection elements 410 represent all known driver variables that are associated with any target variable. The user interface 400 provides the ability to select one or more driver variables (e.g., using checkboxes), and deselect any driver variables that the user is not interested in analyzing.

In some implementations, selecting a driver variable using driver variable selection elements 410 causes the user interface 400 to present a driver importance value of that driver variable in the driver importance analysis view 440. For example, the user interface 400 may be configured to respond to selection of the "Open Marketing Email" variable selection element 414 by generating (or appending to) a query that requests the driver importance value of the "Open Marketing Email" driver variable to the "Deal Closed" target variable.

In one embodiment, the aforementioned query is executed by query execution engine 126. Query execution engine 126 may be configured to obtain the driver importance value by, for example, querying the results of a machine learning model's operation as indicated above. The obtained driver importance value for the "Open Marketing Email" driver variable may be, for example, 0.08. These driver importance values may be expressed relative to a scale of −1 to +1. The closer a driver importance value is to −1, the less it is correlated with the value of a target variable. Similarly, the closer a driver importance value is to +1, the more it is correlated with the value of a target variable.

As shown, the user interface 400 also includes driver importance analysis view 440. In some implementations, driver importance analysis view 400 provides textual and/or graphical representations of driver importance values indicating an importance or relevance of each driver variable to a target variable. In one embodiment, the user interface 400 receives the driver importance value for a selected driver variable and presents it via driver importance analysis view 400. For example, the received driver importance value of 0.08 is presented for the "Open Marketing Email" driver variable, as shown in FIG. 4. In some implementations, the user interface 400 is configured to cause presentation of the driver importance value in driver importance analysis view 400 in response to the selection of a driver variable from driver variable selection elements 410. In other words, a user just has to select, for example, the "Open Marketing Email" variable selection element 414 to cause the presentation of the value "0.08" as text or graphics in driver importance analysis view 440. In other implementations, the user interface 400 may configured to receive a selection of a decision analysis element (e.g., the "Driver Importance" element 422) and also a selection of a variable selection element before presenting the driver importance value. In still other implementations, the user interface 400 may be configured to receive a selection of the driver variable using the driver importance analysis view 440.

As shown, the user interface 400 also includes decision analysis selection elements 420. In some implementations, decision analysis selection elements 420 can be used to select the type of decision analysis desired by a user. As shown, the possible decision analysis types are "Driver Importance", "Sensitivity", "Target inversion", and "Constrained", which correspond to selection elements 422, 424, 426, and 428, respectively. In one embodiment, selection of the "Driver Importance" selection element 422 causes the presentation of driver importance analysis view 440. As an example, the initial presentation of the driver importance analysis view 440 may include all possible driver variables plus their corresponding driver importance values. In another example, the driver importance analysis view 440 may be blank, pending selection of a driver variable selection element from driver variable selection elements 410. Decision analysis selection elements 420 may also include an "Execute" element 429, whose selection may cause the user interface 400 to present the corresponding decision analysis view. In other embodiments, presentation of and selection of the "Execute" element 429 may not be provided, such that selection of the selection element for the desired decision analysis causes its presentation on the user interface 400.

Perturbation Analysis

As shown, the user interface 400 also includes perturbation analysis selection elements 430. While the abovementioned machine learning model is being trained based on a particular set of historical data, a user may wish to perform at least two different types of perturbation analysis on a dataset.

A first type of perturbation analysis may be a sensitivity analysis. In sensitivity analysis, a user may wish to determine the sensitivity of a target variable to perturbations (changes) in the value of a driver variable. For example, the user may wish to know if and how a target variable's value (e.g., number of deal closings) changes if a drive variable's value (e.g., number of marketing emails opened) increases by 10%. To provide sensitivity analysis functionality, the user interface 400 provides elements 432 and 434, corresponding to "Numeric" and "Percentage" values respectively. The user interface 400 also provides elements 436 and 438 corresponding to "Lower Bound" and "Upper Bound" respectively. In some implementations, the user interface 400 receives a selection of a driver variable (e.g., "Open Marketing Email") via one of the driver variable selection elements 410, and also a numeric or percentage value indicating a change in the driver variable's value (e.g., +450, +10%, −15%, or the like). The user interface 400 may be configured to produce a state specification that results in a query that includes the selected values. The query execution engine 126 can then execute the query and determine (e.g., using the operations of a machine learning model) an updated target variable value that results from a change in a current driver variable value. The change in the target variable value may be presented using, for example, perturbation analysis view 460.

As shown in FIG. 4, perturbation analysis view 460 indicates a target and a changed target. While a target value may be shown as a numeric value, such as 1000 deal closings this month, the target value may also itself be shown as a percentage, such as the number of deal discussions that resulted in a deal closing. Accordingly, the target value shown in perturbation analysis view 460 is 41.89%, which may indicate, for example, that 41.89% of customer interactions involving deal closing (e.g., meetings, emails regarding new deals) resulted in a deal being closed (e.g., a contract being signed, a proposal being accepted, etc.). This may be a simple calculation that may or may not require the abovementioned machine learning systems. However, perturbation analysis view 460 also shows a changed target value of 46.24%. As described above, this is a result of the querying of machine learning model calculations that show the change to a target value given the change in a driver variable value. For example, the user interface 400 may receive the inputs "Open Marketing Email" and "+10%". The user interface 400 may generate a query based on a state specification that includes these inputs and provide it to the query execution engine 126. The query execution engine 126 may then execute the query that includes the values "Open Marketing Email" and "+10%". Using outputs from the machine learning model, the query execution engine 126 can determine the predicted value for a target variable in the hypothetical scenario where customers open marketing emails they receive at a rate 10% higher than the current rate. For example, if customers opened marketing emails by 10% more, the machine learning model may predict that a deal closing rate may go up to 46.24%.

A second type of perturbation analysis may be a constrained analysis based on the user's preferences. Generally, a business user may have specific domain knowledge regarding a particular business area (e.g., the relevance of online advertising to the business's growth). Such domain knowledge may inform the business user's decision making. Accordingly, while a machine learning model may be able to provide driver variable values for a target variable using all available historical data, the user may wish to constrain the machine learning calculations in specific ways. For example, based on the historical data, the machine learning model may calculate that a particular driver variable (e.g., "Open Marketing Email") has a driver importance value of 0.08. But the user may have domain knowledge or awareness (e.g., through other research or experience) that, generally, email recipients open marketing emails no more than 50% of the time. Additionally, the user may wish to determine whether a specific value for a target variable (e.g., 100 Deal Closings this month) will be met. Accordingly, the user may enter constraints on the Open Marketing Email driver variable using perturbation analysis selection elements 430 (e.g., constraining the Open Marketing Email variable to 50%). The user interface 400 may be configured to provide the constraint values to the query execution engine 126, which in turn executes a query whose results indicate whether the target value will be met given the constraints applied by the user.

Target Inversion Analysis

As shown, the user interface 400 also includes target inversion elements 450. The target inversion elements 450 may be used to perform target inversion analysis, another type of decision analysis. More specifically, the user interface 400 provides the ability to enter a target variable value (e.g., a numeric or percentage value) and receive suggested driver values that are values for a driver that would be required to achieve that target variable value. As used herein, suggested driver values are distinct from driver importance values. As noted above, the driver importance values may be feature correlation coefficients of a machine learning model that indicates the importance of each driver variable to a target variable. By contrast, suggested driver values that result from target inversion analysis are actual values for a driver variable.

Target inversion elements 450 include elements 452, 454, 456, 458, and 459 corresponding to "Objective Type", "Target", "Original Value", "Achieved Value", "Suggested Driver Values" respectively. In one embodiment, the user interface 400 receives the objective type through element 452. The objective type may include, for example, to maximize a target value. In other words, the user may wish to determine the driver variable values that will result in the greatest value for a target variable. For example, the user may wish to determine values for driver variables that will give the highest number of deal closings that can possibly be achieved given the historical data on the target variable and its correlated driver variables.

Similarly, the user interface 400 receives the target variable identifier (e.g., "Deal Closings") via element 454. Element 454 may be a text input box, in which case the user interface 400 may be configured to compare the entered text to known target variables. Alternatively, element 454 may enable selection of a target variable from a list of target variables.

Based on the received objective type and target variable identifiers, the user interface 400 and query execution engine 126 may be configured to produce suggested driver values and present those via the user interface 400. Similar to the methods used for other types of decision analysis, the user interface 400 may be configured to convert the received inputs into a state specification that forms part of a query executed by the query execution engine 126. The query execution engine 126 then executes the query. In this case, the query may retrieve results from a database and cause execution of a machine learning model that is being trained on historical driver variable and target variable data. The machine learning model may be configured to generate suggested values of a set of driver variables given a specific value or objective for a target variable. For example, the machine learning model may use Bayesian optimization functions to return an optimal value for a target variable. These suggested driver values may be presented using one or more graphical elements represented as element 459 in FIG. 4. Additionally, the target inversion elements 450 may also indicate a confidence level of the model (not shown) and may also indicate more than one driver variable value or a range of driver variable values that is predicted to result in the optimal value for the target variable.

As shown, the user interface 400 also includes dataset table view 470. The user interface 400 may present all or part of a dataset that is being used by a machine learning model to generate driver importance values and/or changed target variable values. In the dataset table view 470, every row may represent, for example, a prospective customer and every column represents the counts of activities that prospects performed such as Chats, Meetings attended, etc. The Deal Close state of each prospective customer is also provided in dataset table view 470.

The abovementioned systems and methods improve the operation of the computer system by providing an interactive visual data analysis system that reduces computer processing that is required in known systems to first transform, filter, and "slice and dice" data so that it is comprehensible to a business user who is unfamiliar with complex computer data analysis tools, machine learning algorithms, and computer systems in general. The front-end user interface coupled to the query execution engine and machine learning system obviate the need for a computer system that receives query inputs (e.g., using a query editor). Moreover, the operation of the computer system is further improved because the database need not be stored on the same client computing system that presents the user interface. Rather, the disclosed systems and methods provide a client-server architecture where any client device can use the user interface 400 to perform various decision analysis tasks without requiring import of the data or an access to or understanding of the underlying querying and machine learning systems.

Figure 5:
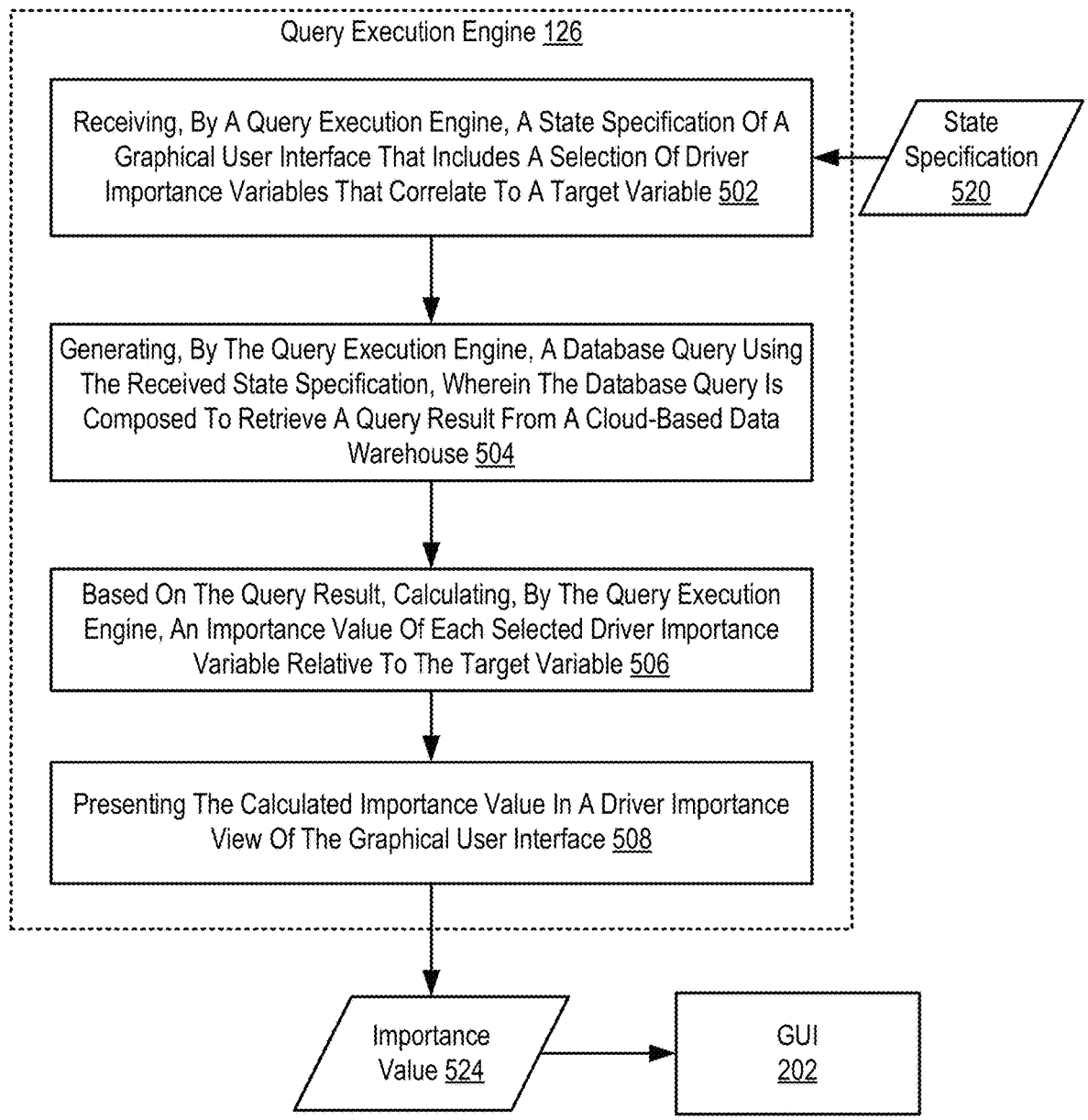
FIG. 5 sets forth a flow chart illustrating an exemplary method for augmenting decision-making via interactive what-if analysis according to embodiments of the present invention.

For further explanation, FIG. 5 sets forth a flow chart illustrating a further exemplary method for augmenting decision-making via interactive what-if analysis according to embodiments of the present invention that includes receiving 502, by a query execution engine, a state specification 520 of a graphical user interface that includes a selection of driver variables that correlate to a target variable; generating 504, by the query execution engine, a database query using the received state specification, wherein the database query is composed to retrieve a query result from a cloud-based data warehouse; based on the query result, calculating 506, by the query execution engine, an importance value of each selected driver variable relative to the target variable; and presenting 508 the calculated importance value in a driver importance view of the graphical user interface.

The method of FIG. 5 includes receiving 502, by a query execution engine, a state specification 520 of a graphical user interface that includes a selection of driver variables that correlate to a target variable. As described above with respect to FIG. 4, the user interface 400 presents various driver variables for selection using graphical user interface selection elements. In one embodiment, the user interface 400 presents the set of driver variables based on a received input of a selected target variable. In other embodiments, any set of driver variables may be presented for selection. In yet another embodiment, the user interface 400 presents affordances such as text input boxes where a user can manually input a driver variable selection.

The method of FIG. 5 further includes generating 504, by the query execution engine, a database query using the received state specification, wherein the database query is composed to retrieve a query result from a cloud-based data warehouse. Generating 504 the database query using the received state specification may be carried out by the query execution engine 126, which receives the state specification including graphical user interface selections/inputs and includes them in a query. The query is executed against the database (e.g., database 204). In one embodiment, the database includes driver variable data and target variable data. Additionally, the database can include outputs from one or more machine learning models that are configured to ingest driver variable data and target variable data and output values such as driver importance values, changed target values, and suggested driver values, as described above.

The method of FIG. 5 includes based on the query result, calculating 506, by the query execution engine, an importance value 524 of each selected driver variable relative to the target variable. As described above with respect to FIG. 4, the query execution engine 126 may be configured to calculate importance values for selected driver variables. For example, the query execution engine 126 may receive a selection of target variable "Deal Closing" and driver variables "Renewal", "Open Marketing Email", and "Chat". As part of the calculation, the query execution engine 126 may provide these inputs to a machine learning system that outputs importance values for each of the selected driver variables relative to the "Deal Closing" target variable. For example, the query execution engine 126 may calculate, for example, an importance value of 0.23 for "Renewal". This may indicate, for example, that there is some importance of subscription renewals or account renewals to the target variable of "Deal Closing".

Similarly, the query execution engine 126 may calculate an importance value of 0.08 for "Open Marketing Email". This may indicate, for example, that there is very slight positive correlation between the number of marketing emails that customers open and the target variable of "Deal Closing". The query execution engine 126 may also calculate an importance value of 0.02 for "Chat". This may indicate, for example, that there is almost no correlation between the customer interactions using the business's chat functionality and the target variable of "Deal Closing". Accordingly, a business user may determine that more investment could be made in customers that are associated with renewals, and that some increase in marketing emails sent to customers may help with closing more deals, but that investment in the chat functionality is likely to bring little or no increase in deal closing rates.

The method of FIG. 5 includes presenting 508 the calculated importance value 524 in a driver importance view of the graphical user interface. As described above with respect to FIG. 4, the user interface 400 may present importance values for driver variables in a driver importance analysis view 440. The importance values may be presented as text and/or graphical elements. The importance values may be presented as bar charts, histograms, pie charts, or any graphical representation designed to present proportional values of one or more variables.

Figure 6:
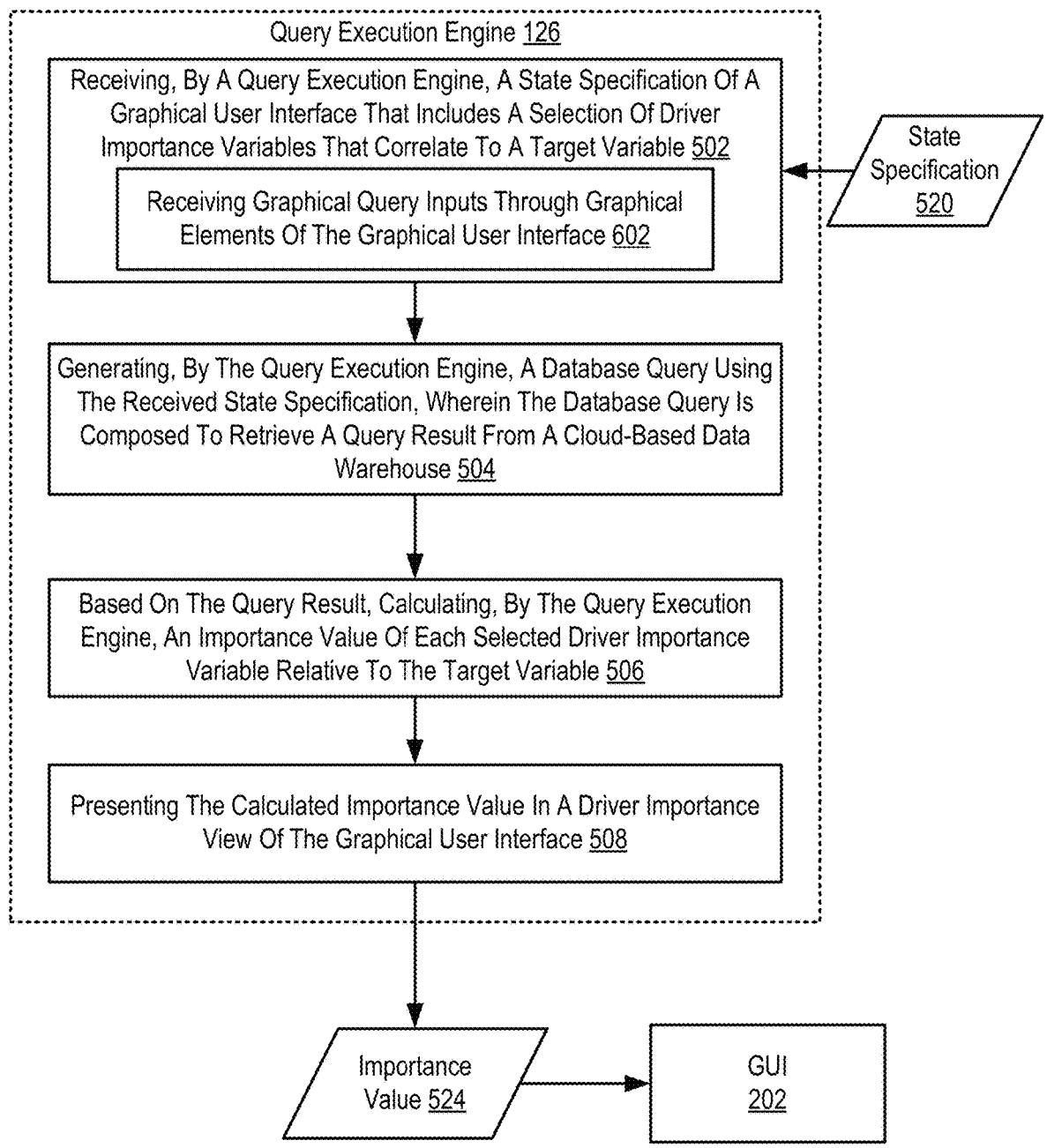
FIG. 6 sets forth a flow chart illustrating an exemplary method for augmenting decision-making via interactive what-if analysis according to embodiments of the present invention.

For further explanation, FIG. 6 sets forth a flow chart illustrating a further exemplary method for augmenting decision-making via interactive what-if analysis according to embodiments of the present invention. The method of FIG. 6 is similar to that of FIG. 5 in that the method FIG. 6 also includes receiving 502, by a query execution engine, a state specification of a graphical user interface that includes a selection of driver variables that correlate to a target variable; generating 504, by the query execution engine, a database query using the received state specification, wherein the database query is composed to retrieve a query result from a cloud-based data warehouse; based on the query result, calculating 506, by the query execution engine, an importance value 524 of each selected driver variable relative to the target variable; and presenting 508 the calculated importance value 524 in a driver importance view of the graphical user interface.

The method of FIG. 6 differs from the method of FIG. 5, however, in that receiving 502, by a query execution engine, a state specification 520 of a graphical user interface that includes a selection of driver variables that correlate to a target variable includes receiving 602 graphical query inputs through graphical elements of the graphical user interface. As described above with respect to FIG. 4, the user interface 400 provides the ability to enter query inputs to a query that will obtain driver importance values, target variable values, and suggested driver values from the processing of a machine learning model. However, the user interface 400 enables use of graphical elements (rather than a query editor or other programming language editor or development studio) for providing inputs to the abovementioned queries. For example, the user interface 400 provides driver variable selection elements 410. When a user selects one of driver variable selection elements 410, such as element 412, the user interface generates or updates a state specification with an input corresponding to element 412. The state specification is then used to generate a query that can be used to obtain an importance value for that selected driver variable.

In addition to use of driver variable selection elements 410, the user interface 400 also provides the ability to provide changes to or constraints on the value of a driver variable through perturbation analysis selection elements 430. A user can enter values using text input or through graphical elements (e.g., a slider) that represent driver variable values or constraints on driver variable values. Based on these graphical inputs, the user interface 400 generates the abovementioned state specification that then forms part of a query. The results of the query can indicate, for example, changed target values that result from the changed or constrained driver variables.

Additionally, the user interface 400 may also receive graphical query inputs via perturbation analysis view 460. For example, the graphical elements of perturbation analysis view 460 may be interactive. For example, on a touch-sensitive display screen, the user interface 400 may receive a user's touch input. The touch input may be a touch-and-drag input that drags a bar on a bar chart, such as the bar labeled "Changed Target" in perturbation analysis view 460. The user may wish to increase the value of the changed target from 46.24% to 50.00%, because the user wishes to see the driver variable values required for Deal Closings to rise to 50%. In response to the user's touch-and-drag input, the user interface 400 may be configured to update a state specification that causes execution of a query using the new value for the target variable. As a result of execution of the query, new values for the driver variables may be obtained. For example, the user's touch input on the perturbation analysis view 460 may cause presentation of a recalculated numeric or percentage increase/decrease value for a driver variable through one or more of perturbation analysis selection elements 430. Similarly, the user's input on the perturbation analysis view 460 may cause presentation of update values in the element 459 corresponding to "Suggested Driver Values" in target inversion elements 450.

Figure 7:
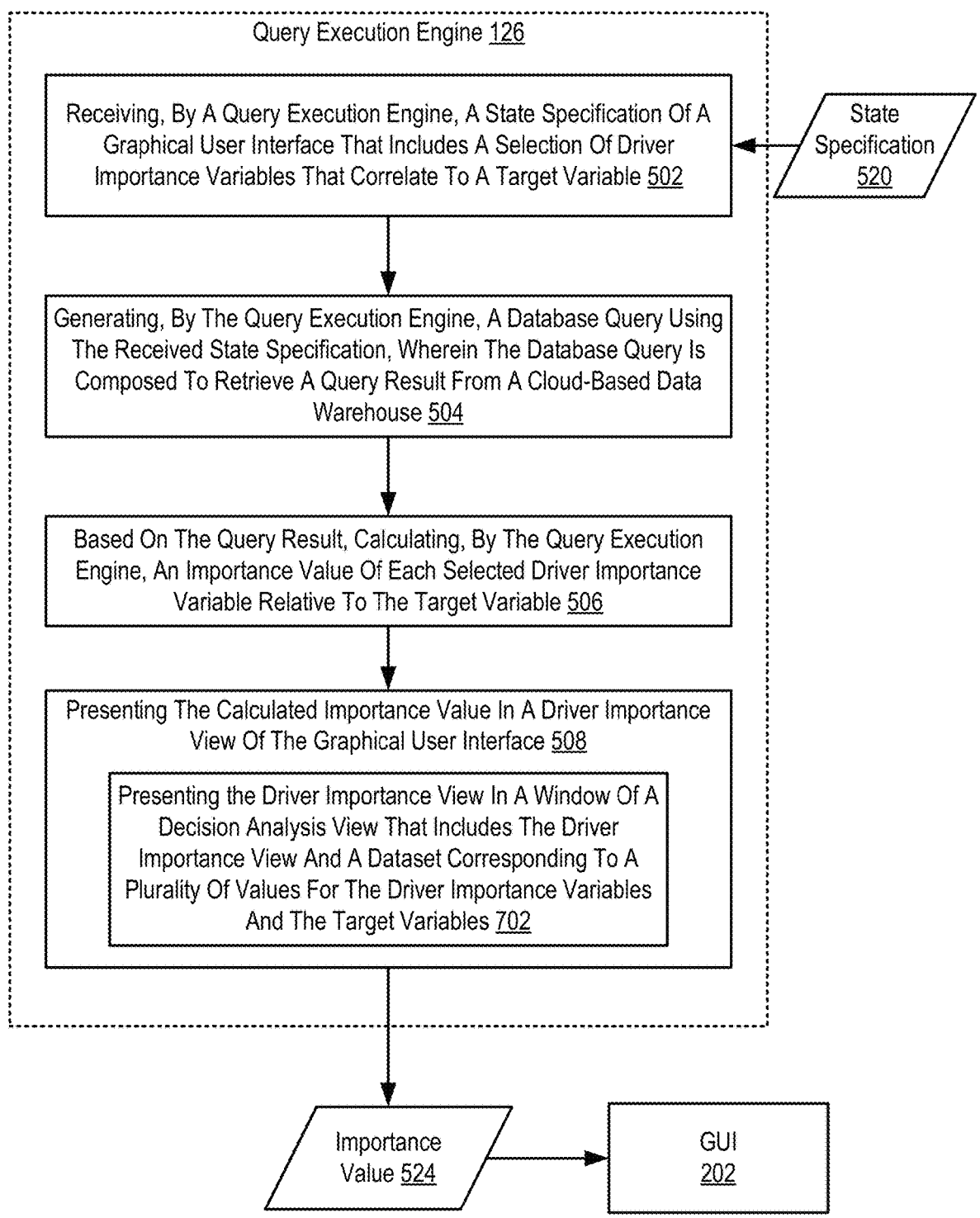
FIG. 7 sets forth a flow chart illustrating an exemplary method for augmenting decision-making via interactive what-if analysis according to embodiments of the present invention.

For further explanation, FIG. 7 sets forth a flow chart illustrating a further exemplary method for augmenting decision-making via interactive what-if analysis according to embodiments of the present invention. The method of FIG. 7 is similar to that of FIG. 5 in that the method FIG. 7 also includes receiving 502, by a query execution engine, a state specification of a graphical user interface that includes a selection of driver variables that correlate to a target variable; generating 504, by the query execution engine, a database query using the received state specification, wherein the database query is composed to retrieve a query result from a cloud-based data warehouse; based on the query result, calculating 506, by the query execution engine, an importance value 524 of each selected driver variable relative to the target variable; and presenting 508 the calculated importance value 524 in a driver importance view of the graphical user interface.

The method of FIG. 7 differs from the method of FIG. 5, however, in that presenting 508 the calculated importance value 524 in a driver importance view of the graphical user interface also includes presenting 702 the driver importance view in a window of a decision analysis view that includes the driver importance view and a dataset corresponding to a plurality of values for the driver variables and the target variables.

As shown in FIG. 4, the driver importance analysis view 440 and the dataset table view 470 may be presented in the same user interface 400. Accordingly, a user can simultaneously see the data pertaining to driver variables and the importance value of each driver variable to the target variable. For example, on a client device such as client computing system 194, the user can view the driver importance analysis view 440 and the dataset table view 470 in the same web browser window.

In view of the explanations set forth above, readers will recognize that the benefits of augmenting decision-making via interactive what-if analysis according to embodiments of the present invention include:
- Improving the operation of a computing system by providing an interactive visual data analysis system that reduces computer processing required for transforming data so that it is comprehensible to a user unfamiliar with complex computer data analysis tools, machine learning algorithms, and computer systems in general. The front-end user interface coupled to the query execution engine and machine learning system obviate the need for a computer system that receives query inputs (e.g., using a query editor). Moreover, the operation of the computer system is further improved because the database need not be stored on the same client computing system that presents the user interface. Rather, the disclosed systems and methods provide a client-server architecture where any client device can use the user interface to perform various decision analysis tasks without requiring import of the data or an access to or understanding of the underlying querying and machine learning systems.

Exemplary embodiments of the present invention are described largely in the context of a fully functional computer system for augmenting decision-making via interactive what-if analysis. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for augmenting decision-making via interactive what-if analysis, the method comprising:
   receiving, by a query execution engine, a state specification of a graphical user interface that includes a selection of driver importance variables that correlate to a target variable;
   generating, by the query execution engine, a database query using the received state specification, wherein the database query is composed to retrieve a query result from a cloud-based data warehouse;
   based on the query result, calculating, by the query execution engine, an importance value of each selected driver importance variable relative to the target variable;
   presenting the calculated importance value in a driver importance view of the graphical user interfaces;
   calculating the importance values based on a machine learning model;
   training the machine learning model to generate the driver importance view, the training comprising:
      obtaining training data sets, each training data set of historical data comprising:
         one or more values for the target variable; values of driver importance variables associated with the one or more values for the target variable;
      training the machine learning model based on the training data sets; and
      applying the machine learning model to the selection of one or more driver importance variables to calculate the importance value of each selected driver importance variable.

2. The method of claim 1, further comprising receiving graphical query inputs through graphical elements of the graphical user interface.

3. The method of claim 1, wherein the query comprises a SQL query.

4. The method of claim 1, wherein the graphical user interface is presented in a web browser.

5. The method of claim 1, wherein the driver importance view comprises a window of a decision analysis view that includes the driver importance view and a dataset corresponding to a plurality of values for the driver importance variables and the target variables.

6. The method of claim 1, further comprising presenting the driver importance view and the dataset in a same graphical user interface.

7. The method of claim 1, further comprising presenting the driver importance view and the dataset in a same web browser window.

8. An apparatus for augmenting decision-making via interactive what-if analysis, the apparatus comprising a computer processor, a computer memory operatively coupled to the computer processor, the computer memory having disposed within it computer program instructions that, when executed by the computer processor, cause the apparatus to carry out the steps of:

receiving, by a query execution engine, a state specification of a graphical user interface that includes a selection of driver importance variables that correlate to a target variable;

generating, by the query execution engine, a database query using the received state specification, wherein the database query is composed to retrieve a query result from a cloud-based data warehouse;

based on the query result, calculating, by the query execution engine, an importance value of each selected driver importance variable relative to the target variable;

presenting the calculated importance value in a driver importance view of the graphical user interface;

calculating the importance values based on a machine learning model;

training the machine learning model to generate the driver importance view, the training comprising:

training the machine learning model to generate the driver importance view, the training comprising:

obtaining training data sets, each training data set of historical data comprising:

one or more values for the target variable;

values of driver importance variables associated with the one or more values for the target variable;

training the machine learning model based on the training data sets; and applying the machine learning model to the selection of one or more driver importance variables.

9. The apparatus of claim 8, wherein the computer program instructions further cause the apparatus to carry out the steps of receiving graphical query inputs through graphical elements of the graphical user interface.

10. The apparatus of claim 8, wherein the driver importance view comprises a window of a decision analysis view that includes the driver importance view and a dataset corresponding to a plurality of values for the driver importance variables and the target variables.

11. The apparatus of claim 8, wherein the computer program instructions further cause the apparatus to carry out the steps of presenting the driver importance view and the dataset in a same graphical user interface.

12. A computer program product for prefetching query results using expanded queries, the computer program product disposed upon a non-transitory computer readable medium, the computer program product comprising computer program instructions that, when executed, cause a computer to carry out the steps of:

receiving, by a query execution engine, a state specification of a graphical user interface that includes a selection of driver importance variables that correlate to a target variable;

generating, by the query execution engine, a database query using the received state specification, wherein the database query is composed to retrieve a query result from a cloud-based data warehouse;

based on the query result, calculating, by the query execution engine, an importance value of each selected driver importance variable relative to the target variable;

presenting the calculated importance value in a driver importance view of the graphical user interface;

calculating the importance values based on a machine learning model;

training the machine learning model to generate the driver importance view, the training comprising:

obtaining training data sets, each training data set of historical data comprising:

one or more values for the target variable;

values of driver importance variables associated with the one or more values for the target variable;

training the machine learning model based on the training data sets; and applying the machine learning model to the selection of one or more driver importance variables.

13. The computer program product of claim 12, wherein the computer program instructions further cause the computer to carry out the steps of receiving graphical query inputs through graphical elements of the graphical user interface.

14. The computer program product of claim 12, wherein the driver importance view comprises a window of a decision analysis view that includes the driver importance view and a dataset corresponding to a plurality of values for the driver importance variables and the target variables.

* * * * *